United States Patent
Prasse et al.

[11] 3,762,728
[45] Oct. 2, 1973

[54] PISTON RING

[75] Inventors: Herbert F. Prasse, Town and Country; Harold E. McCormick, Ballwin, both of Mo.

[73] Assignee: Ramsey Corporation, St. Louis, Mo.

[22] Filed: Mar. 23, 1971

[21] Appl. No.: 127,177

Related U.S. Application Data

[62] Division of Ser. No. 802,351, Feb. 26, 1969, Pat. No. 3,606,354.

[52] U.S. Cl.................. 277/140, 277/141, 267/1.5
[51] Int. Cl............................................. F16j 9/20
[58] Field of Search................... 277/140, 200, 139, 277/141; 267/1.5

[56] References Cited
UNITED STATES PATENTS
3,628,800   12/1971   Prasse............................... 277/140

Primary Examiner—Samuel B. Rothberg
Attorney—Hill, Sherman, Meroni, Gross & Simpson

[57] ABSTRACT

A spacer-expander ring for piston oil ring assemblies which can be economically and easily manufactured in continuous strip form, rolled and cut into split rings of desired size and heat treated to snap into a closed continuous ring with a diameter less than the diameter of the piston for which it is intended. The ring is circumferentially continuous, its ends will not overlap and it has individual spring fingers at its innermost periphery to engage the inner peripheries of thin split rail rings supported thereon.

2 Claims, 6 Drawing Figures

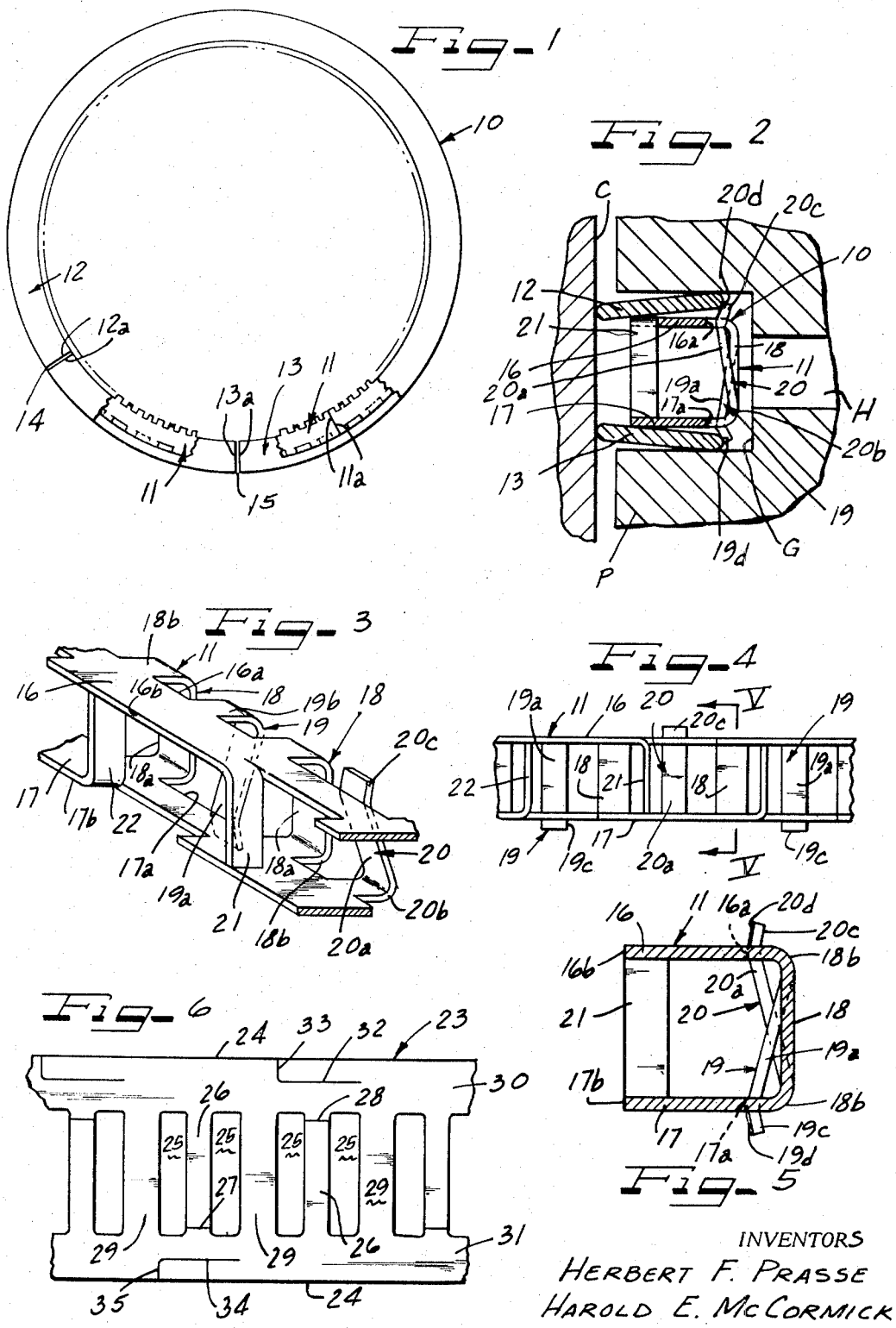

PISTON RING

RELATED APPLICATION

This application is a division of our copending application Ser. No. 802,351 entitled "Piston Ring," filed Feb. 26, 1969, now U.S. Pat. No. 3,606,354.

FIELD OF THE INVENTION

This invention relates to the packing or piston ring art and more particularly to spacer-expander rings for oil control piston ring assemblies.

DESCRIPTION OF THE PRIOR ART

Spacer-expander rings for oil control piston ring assemblies are usually of the circumferential expansion or garter spring-type such as shown for example in the Marien United States Letters Patent Nos. 2,744,803 and 2,830,861. These rings can be made from strip stock but much of the stock must be cut-away and the remaining portion crimped, corrugated or otherwise longitudinally foreshortened to provide a circumferentiallly expansible ring. This type of ring must be contracted into the ring groove of the piston in order that it may exert a radial expanding force on the rail rings suported thereby. Such contraction tends to overlap the split ends of the ring requiring end abutment tabs and the like to stop the overlapping. Further, since the rings are circumferentially segmented they do not have the strength of a continuous ring.

SUMMARY OF THE INVENTION

The present invention now provides a circumferentially continuous spacer-expander ring made from a minimum amount of strip stock and having individual spring fingers circumferentially spaced around its inner periphery and extending axially beyond the rail ring supporting surfaces thereof to engage the inner peripheries of the rail rings for exerting an expanding force thereon. The ring is manufactured from continuous metal strip stock, rolled and cut into split rings of desired size and tempered to snap into a closed continuous ring with the ends abutting and having a diameter less than the diameter of the piston for which it is intended. Since the ring is not circumferentially contracted in use there is no tendency for its ends to overlap and special shaped end abutments heretofore required are not necessary. Thus the strip stock from which the rings are formed may be segmented into lengths for forming the desired diameter rings without loss of material between segments.

The individual spring fingers at the inner periphery of the rings of this invention are inwardly of the circumferentially continuous ring portions which support the rails and these rails do not have to be decreased in radial depth such as is necessary when the fingers are outwardly from the inner periphery of the supporting ring. The fingers have angled tab ends to dish the rails into side sealing engagement with the ring groove. Firmer support for the rail rings is provided since they are engaged by the fingers at their inner peripheries and rest on continuous ring areas near their outer peripheries.

The spacer-expander rings of this invention will not accept the rail rings except on the proper supporting surfaces thereof since no open channels are provided between the supporting surfaces.

The spacer-expander rings of this invention may take many different shapes and forms all of which however include a circumferentially continuous split ring with abutted together ends and individual spring fingers circumferentially spaced around the inner periphery of the ring and extending axially beyond the rail ring supporting surfaces thereof so as to engage the inner peripheries of the rail rings.

It is then an object of this invention to provide spacer-expander rings for oil control piston ring assemblies which have a circumferentially continuous ring portion and individual spring fingers spaced circumferentially around the inner periphery of the rings for engaging the inner peripheries of rail rings supported thereon.

Another object of this invention is to provide an abutment type split spacer-expander ring which will not overlap in a ring groove and which will radially expand rail rings supported thereon without being circumferentially contracted.

Another object of this invention is to provide a spacer-expander oil control ring for pistons which is manufactured from continuous metal strip stock without longitudinally foreshortening the stock.

Another object of the invention is to provide a circumferentially continuous spacer-expander ring with abutted together ends and rail ring expanding fingers at the inner periphery of the ring.

Another object of the invention is to provide a spacer-expander ring for rail ring type oil control piston ring assemblies which has individual spring fingers around the inner periphery thereof acting on the inner peripheries of the rail rings causing them to dish into side sealing engagement with the sides of a piston ring groove as they are urged radially outward.

Other and further objects of this invention will become apparent to those skilled in this art from the following detailed description of the annexed sheet of drawings.

BRIEF DESCRIPTION OF THE DRAWING

FIG. 1 is a plan view of an oil control ring assembly in accordance with this invention with parts broken away to illustrate underlying parts;

FIG. 2 is a fragmentary vertical cross-sectional view of a piston and cylinder illustrating the oil ring groove in the piston equipped with the ring assembly of FIG. 1;

FIG. 3 is a fragmental isometric illustration of one form of spacer-expander ring of this invention;

FIG. 4 is a front-end elevational view of the ring of FIG. 3;

FIG. 5 is a transverse cross-sectional view of the ring taken along the line V—V of FIG. 4; and FIG. 6 is a fragmentary plan view of a blank of metal strip stock from which the ring of FIGS. 3 to 5 is formed.

DESCRIPTION OF THE PREFERRED EMBODIMENT

FIGS. 1 and 2 illustrate a complete oil control ring assembly 10 including a spacer-expander ring 11 of this invention supporting and expanding a pair of thin split expandable metal rail rings 12 and 13. The top rail ring 12 has its ends 12a slightly spaced apart so that a clearance gap 14 is provided therebetween. Likewise, the bottom ring 13 has its ends 13a spaced apart providing a clearance gap 15 therebetween. The ends 11a of the spacer-expander ring 11 however are butted together and no gap exists therebetween so that the ring in its operating position is a continuous circle.

The assembly 10 as shown in FIG. 2 is carried in the oil ring groove G of a piston P which is mounted in an engine cylinder C. The groove G has holes H in the bottom thereof communicating with the interior of the piston for free flow of oil in the groove G.

As shown in FIG. 2 the rail rings 12 and 13 are supported in axially spaced relation on the spacer-expander ring 11 and have their inner peripheries engaged by the ring at an angle which dishes the rails into side sealing engagement with the side walls of the ring groove and urges the rings radially outward into sealing engagement with the cylinder C. The assembly 10 is thus known as a rail ring type side sealing oil control ring which allows free circulation of oil in the ring groove between the rails but seals the oil against leakage between the piston and cylinder beyond the rail rings.

The spacer-expander 11, as best shown in FIG. 3, includes circumferentially continuous top and bottom ring portions 16 and 17 connected in axially spaced parallel relation by circumferentially spaced axially upstanding integral legs 18 around the inner periphery of the ring with each leg 18 having a straight axially upstanding portion 18a with curved ends 18b extending radially outward to the inner peripheries 16a and 17a respectively of the ring portions 16 and 17. These ring portions 16 and 17 have outer peripheral edges 16b and 17b respectively which are radially outward from the inner peripheries a considerable distance. Flat top and bottom faces of appreciable radial depth are thus provided by the rings 16 and 17.

The legs 18 alternate with spring fingers 19 and 20 respectively depending from the top ring 16 and the bottom ring 17.

Each finger 19, as shown in FIGS. 3 to 5, has a main portion 19a depending from a rounded top end 19b which extends radially inward from the inner edge 16a of the top ring 16 to the same extent as the rounded ends 18b of the legs 18 and then the portion 19a slopes axially downward and radially outward as shown in FIG. 5 into close spaced relation with the inner edge 17a of the bottom ring 17. The fingers 19 have end tabs 19c projecting beneath the ring 17 and bent backwardly to provide an abutment front face 19d at an angle, preferably 7° to 12° from the vertical.

The fingers 20 are shaped and formed in the same manner as the fingers 19 with upwardly and outwardly extending main portions 20a depending from rounded ends 20b which extend radially inward from the ring 17 to the same depth as the fingers 18 and with the portions 20a extending outwardly close to the rear edge 16a of the top ring 16. An abutment tab 20c on each finger 20 then extends beyond the top ring 16 and is angled backwardly at the same angle as the tab 19c to provide the abutment face 20d.

Struts 21 and 22 depend alternately from the top and bottom rings 16 and 17 at the outer peripheral edges of these rings with the struts 21 depending from the top ring 16 being bottomed on the bottom ring 17 and with the struts 22 depending from the bottom ring 17 being bottomed on the top ring 16. The struts 21 and 22 are equally spaced around the periphery of the ring and prevent the rail rings from entering the channel between the rings 16 and 17.

As shown in FIG. 2, the rail rings 12 and 13 have their inner edges engaged by the angled abutment faces 20d and 19d respectively of the spring fingers 20 and 19 and these fingers are bent back from their free state condition of FIG. 5 so as to exert radially outward and axially outward expanding forces on the rings 11 and 12 urging their outer peripheries into good sealing condition with the cylinder C.

The rail rings 12 and 13 are supported on the ring portions 16 and 17 of the spacer-expander 11 near the outer peripheral ends of these rings and the rail rings are free to rock on the surfaces provided by these rings 16 and 17.

It should be understood that in the free state condition of the ring 11 the ends 11a thereof are abutted. The ring is easily slipped over the piston to snap into the groove G and when its ends are abutted together in the groove the inner periphery of the ring is of larger diameter than the ring groove so that the back wall of the ring groove is spaced from the inner periphery of the assembly as shown in FIG. 2. The ring 11 is not circumferentially compressed in the ring groove and therefore its ends 11a have no tendency to overlap. No special end abutment tabs need be provided as in the case of garter spring type rings.

The spring fingers 19 and 20 act independently on the rail rings 12 and 13 to provide their spring force action from bases which are solid continuous rings 16 and 17. In the operative position, the abutment faces 19d and 20d of the spring fingers are at the inner periphery of the spacer-expander 11 and the rail rings 12 and 13 can have the same radial depths as when used in garter spring type assemblies.

As shown in FIG. 6, the ring 11 is made from a blank 23 that is punched out from a continuous metal strip. The blank 23 has parallel side edges 24 and is transversely punched to provide adjacent pairs of cut-out portions 25 separated by a strip 26. Alternate strips 26 have opposite ends 27 and 28 severed from the blank to provide free ends for the strips.

The pairs of cut-outs 25 are separated from each other by strips 29 wider than the strips 26. Continuous margin portions 30 and 31 extend inwardly from the edges 23 and 24 to the ends of the punched out sections 25. Each marginal portion 30 and 31 is lanced at intervals, preferably alternately overlying the pairs of punched out portions 25. Thus, the marginal portion 30 has a longitudinal cut 32 parallel with the edge 23 terminating in a transverse cut 33 extending to the end edge 23. The cut 32 is about the same length as the distance between the strip portions 29.

The marginal portion 31 is similarly cut with a longitudinal cut 34 terminating in a transverse cut 35.

The blank 23 is bent into a u-shape with the marginal portions 30 and 31 forming the top and bottom rings 16 and 17 of the finished ring 11, with the portions 29 forming the legs 18 of the ring, with the portions 26 forming the spring fingers 19 and 20 and with the cut-out portions provided by the cuts 32-35 forming the struts 21 and 22. The ring 11 can be formed in a continuous strip form, cut into segments for forming the rings of desired diameter, coiled into ring shape with the ends abutting, and heat treated so that the coil rings will have their ends abutted together in the free state. The material forming the ring can be a steel such as SAE 1075 and a coining operation can be used to accurately shape the abutment faces 19d and 20d of the fingers.

For 1075 material the heat treatment may consist of heating the finished rings to 1500° F and quenching in oil. This is followed by a tempering operation in which the rings may be heated to 600° F. for one hour to secure the desired spring properties and a hardness in the range of 45–55 Rockwell "C".

It will be understood, however, that other materials than 1075 steel can be used in which the heat treatment may be altered to acquire the desired spring properties.

From the above description it will be understood that the spacer-expanders of this invention do not contract circumferentially in operation, have two continuous circumferential portions, and have individual spring fingers projecting axially above and below these portions radially inwardly therefrom to expand and dish rail rings resting on the portion or portions.

Although various minor modifications might be suggested by those versed in the art, it should be understood that we wish to embody within the scope of the patent warranted hereon all such modifications as reasonably and properly come within the scope of our contribution to the art.

We claim as our invention:

1. A spacer-expander ring for oil control piston ring assemblies which comprises a split metal ring having abutted-together ends in operation and axially spaced top and bottom radially extending continuous circumferential walls between said ends connected by circumferentially spaced legs around the inner periphery of the ring with ends extending radially inward from said continuous circumferential walls and cooperating therewith to provide top and bottom surfaces adapted to support rail rings mounted thereon, and circumferentially spaced upstanding spring fingers between said legs each having one end extending radially inward from the inner periphery of one wall providing an additional surface adapted to support the rail rings, each of the spring fingers extending axially and radially outward, and having a free end projecting above the other wall, said spring fingers being alternately arranged to provide free ends beyond both walls on opposite sides of the legs for engaging the inner peripheries of rail rings supported on the walls, said free ends being angled radially inward and struts formed from portions of the outer periphery of the continuous circumferential wall bent axially to span the distance between the walls, preventing the walls from moving axially towards one another, and said fingers and said legs being circumferentially spaced from one another to provide drainage radially through said ring.

2. The ring of claim 1 wherein one strut depends from one wall and the adjacent strut depends from the opposite wall and the free ends of the struts engage the walls opposite those from which they depend.

* * * * *